United States Patent [19]

Sychev et al.

[11] Patent Number: 4,519,836

[45] Date of Patent: May 28, 1985

[54] METHOD OF PROCESSING LEAD SULPHIDE OR LEAD-ZINC SULPHIDE ORES, OR SULPHIDE CONCENTRATES, OR MIXTURES THEREOF

[75] Inventors: Anatoly P. Sychev; Jury I. Sannikov; Jury A. Grinin; Ivan P. Polyakov; Jury M. Abdeev, all of Ust-Kamenogorsk, U.S.S.R.

[73] Assignee: Vsesojuzny Nauchno-Issledovatelsky Institut Tsvetnoi Metallurgii, Ust-Kamenogorsk, U.S.S.R.

[21] Appl. No.: 515,939

[22] Filed: Jul. 20, 1983

[51] Int. Cl.³ .............................................. C22B 13/00
[52] U.S. Cl. .......................................... 75/25; 75/26; 75/77
[58] Field of Search .......................... 75/77, 62, 25, 26

[56] References Cited

U.S. PATENT DOCUMENTS

| | | | |
|---|---|---|---|
| 2,820,705 | 1/1958 | Warner | 75/62 |
| 3,281,237 | 10/1960 | Meissner et al. | 75/77 |
| 3,847,595 | 11/1974 | Liang et al. | 75/77 |
| 4,087,274 | 5/1978 | Edenwall et al. | 75/10 R |
| 4,214,897 | 7/1980 | Verhulst et al. | 75/11 |
| 4,388,110 | 6/1983 | Jensfelt et al. | 75/23 |
| 4,389,247 | 6/1983 | Won et al. | 75/62 |

FOREIGN PATENT DOCUMENTS

| | | | |
|---|---|---|---|
| 2038227 | 6/1973 | Fed. Rep. of Germany | 75/77 |
| 223832 | 2/1968 | Sweden | |

Primary Examiner—Melvyn J. Andrews
Attorney, Agent, or Firm—Ladas & Parry

[57] ABSTRACT

A method of processing lead sulphate or lead-zinc sulphide ores, or sulphide concentrates, or mixtures thereof, residing in that said lead sulphide or lead-zinc sulphide ores, or sulphide concentrates, or mixtures thereof are subjected to roasting-and-reduction in an atmosphere of industrial oxygen in the presence of fluxes with addition of recycle products to a desulphurization of 85 to 100%, with the obtaining of a molten slag, in which the weight ratio of the sum of silicon dioxide and aluminium oxide to ferrous oxide is 0.67–1.22:1 and that of the sum of calcium oxide and magnesium oxide to ferrous oxide is 0.22–0.75:1, with subsequent separation of lead and zinc by way of a selective reduction of lead oxides to metal in the course of filtration of the resulting dispersed slag at a temperature of 1100° to 1400° C. through a bed of a carboniferous material.

7 Claims, No Drawings

METHOD OF PROCESSING LEAD SULPHIDE OR LEAD-ZINC SULPHIDE ORES, OR SULPHIDE CONCENTRATES, OR MIXTURES THEREOF

The present invention relates to methods of processing polymetallic sulphide stock, such as lead sulphide or lead-zinc sulphide ores, or sulphide concentrates, or mixtures thereof.

It may be used to advantage in igneous metallurgy for the winning of lead and producing oxidized zinc sublimates from polymetallic stock.

It is common knowledge that about 90% of the lead produced in the world is obtained from lead sulphide concentrates, using reduction melting in a shaft furnace. Preparatory to the melting, a lead sulphide concentrate is mixed with fluxes, recycle dust, lead-containing by-products, solid fuel, and the resulting mixture is sintered. The sintered concentrate with a maximum sulphur content of 2 to 3 wt.% together with coke (in an amount of 9 to 16% of the weight of the sinter) is charged into a shaft furnace having lances in the bottom portion thereof, arranged over the periphery and serving to feed ambient air or oxygen-enriched air to the furnace. The heat liberated in the furnace due to the oxidation of the coke (about $\frac{2}{3}$ of the charge) is sufficient for heating the charge components to the temperature of 1400° to 1450° C., as well as for compensating for thermal losses and the losses associated with endothermic reactions. The lead-containing oxide melt formed in the zone above the lances and the liquid lead, a product of reducing the sinter in the solid phase, filter through the glowing bed of the coke, which is the place where the reduction of the main bulk of the lead occurs. The products of the reduction process taking place in the shaft furnace are black lead needing refining; slag, from which zinc and remnants of lead and copper are subsequently recovered; and tail gases which are discharged into the atmosphere on being cleaned. The tail gases evolved during the process amount to some 20,000 $Nm^3$ per ton of the lead extracted in a shaft furnace. Most works in the world strive to improve the economy of the process by sintering the charge in downdraught sintermachines and utilizing their exhaust as the source material for producing sulphuric acid. Large shaft furnaces employ hot blast or oxygen-enriched air blast.

Nevertheless, said improvements fail to eliminate some of the significant disadvantages of the process, which are:
  unavoidable sintering of the stock, which complicates the process;
  high energy requirements, attributable to the dissipation of the heat, stored in the sulphide stock, in the course of sintering, on the one hand, and to the necessity of using fuel (coke) in the shaft furnace, on the other hand;
  discharge of the tail gases in significant amounts, which calls for the use of dust-collecting and scrubbing equipment, increasing thus the capital outlays and operating costs;
  large quantities of recycle materials requiring special treatment (cooling, sizing, crushing).

Swedish Pat. No. 223,832 and U.S. Pat. No. 3,281,237 teach a method of processing rich monomineral lead concentrates with particles of a floatative size and lead content of 70 wt.% and higher, which makes use of hot air blast and of some additional fuel, solid or liquid, introduced through special burners to make up for the heat losses due to the endothermic reactions between the lead sulphides and lead oxides. In accordance with this method, lead concentrate is melted with desulphurization being incomplete, albeit in excess of 66%, the sulphur content in the molten slag being then lowered to 2 or 3 wt.% owing to the reactions occurring between the sulphides and lead oxides (present in an excess amount). For final depletion of lead, the molten slag is reduced with a carboniferous reducing agent.

However, this prior art method is characterized by complexity, low productivity, and, if used for processing lead-zinc sulphide concentrates, appears to be unprofitable.

Thus, for example, a concentrate with an industrially recoverable zinc content may invite numerous technical difficulties due to the low oxidation rate of zinc sulphate (compared to that of lead sulphate). The process cannot be run without external sources of heat, this adding to the amount of the tail gases to be cleaned; the percentage of direct lead extraction due to chemical reactions is low.

According to U.S. Pat. No. 3,847,595, the stock is worked by an oxygen-enriched air blast. Pure lead sulphide concentrate is blown into a melt containing at least 35 wt.% of lead in the form of oxide. At a temperature of the flame over 1300° C. and that of the melt bath over 1100° C. the occurring chemical interactions lead to practically desulphurization and formation of some lead metal. The melt with a high content of lead oxides is treated with a reducing agent to recover the lead therefrom.

This method, however, is not free from the disadvantages inherent to the methods based on the chemical interaction: it also displays a low efficiency in melting lead-zinc sulphide concentrates, low productivity, and complexity.

Closer than anything else to the method of the present invention is the so-called oxygen-flash cyclone electrothermal smelting disclosed in FRG Pat. No. 2,038,227, according to which lead sulphide or lead zinc sulphide ores or sulphide concentrates in a mixture with recycle dust and fluxes are subjected to roasting-and-reduction in a vertical flame in an atmosphere of industrial oxygen, catering for a 90 to 100% desulphurization, the oxide melt obtained being then reduced in an electric furnace.

Such high degree of desulphurization provides for a high temperature and a high rate of oxidation, so that the oxidation process comes practically to an end in about 0.1 s, yielding about 30 rel.% of lead metal owing to the reactions between lead sulphides and lead oxides. The oxide melt formed in the zone of flame flows over into the electrothermal zone where liquid black lead and zinc are produced, the latter being then recovered in the form of oxidized zinc sublimates or black zinc metal.

This method of processing lead sulphide or lead-zinc sulphide ores or sulphide concentrates, which is conducive to reducing the discharge of tail gases by a considerable amount and to increasing the productivity compared with other methods of working the charge in a dispersed state, still requires considerable extra inputs of heat (electric power) and features a low production rate (between 3 and 10 tons of concentrate per $m^2$ of the furnace per day) and a low percentage of direct lead extraction (80 to 85%).

This has posed the problem of sharply increasing the productivity of the process of flash smelting of lead sulphide or lead-zinc sulphide ores and concentrates and making maximum use of the calorific value of the sulphides together with increasing the productivity of the reduction processes and the percentage of direct lead extraction.

This problem is solved by the provision of a method of processing lead sulphide or lead-zinc sulphide ores or sulphide concentrates, or mixtures thereof, residing in the roasting-and-reduction of the stock in an atmosphere of industrial oxygen in the presence of fluxes with addition of recycle products to attain a 85 to 100% desulphurization and obtain a molten slag with the weight ratio of the sum of silicon dioxide and aluminium oxide to ferrous oxide of 0.67–1.22:1 and of the sum of calcium oxide and magnesium oxide to ferrous oxide of 0.22–0.75:1, this being followed by separating lead and zinc by way of selective reduction of lead oxides to metal while filtering the resulting molten slag at a temperature of 1100° to 1400° C. through a bed of a carboniferous material.

For enhancing the efficiency of the process of extracting lead metal, it is preferable that the bed of carboniferous material should be given a depth of 55 to 500 mm, maintained throughout the process.

The requisite depth of the bed of carboniferous material can be maintained in the course of the roasting-and-reduction either by charging the reducing agent directly into the bed, or by feeding it with the stock, or, else, by charging the reducing agent into the bed simultaneously with feeding same with the stock. The choice of any of the three ways of controlling the depth of the bed depends on the stability of the stock composition and on the stability of the process conditions.

The essence of the present invention is as follows.

A charge prepared from a lead sulphide or a lead-zinc sulphide ore or a sulphide concentrate, recycle dust, silica and calciferous fluxes is melted in the vertical flame of an oxygen lance located in the furnace roof. The shaft of the furnace is connected to an electric furnace by way of an opening provided below the level of the slag melt, so that the two furnaces function as communicating vessels. Another opening provided in the shaft just above the level of the slag melt serves to remove the dust-laden tail gases and dust from the shaft furnace. The dust separated from the gas in a dust-collecting system is continuously recycled to the process.

The roasting-and-reduction of sulphide stock in the oxygen flame gives a dispersed melt of oxides, consisting of droplets whose size is close to that of floatative particles (around 0.005 cm). In passing through the bed of a solid carboniferous reducing agent, the flow of these finely dispersed droplets is selectively transformed into lead metal, while zinc is left in the form of zinc-rich slag that reaches the electric furnace via the opening below the slag level. Subsequent zinc recovery from this slag may be accomplished, for example, by fuming.

When a charge is melted, in which the weight ratio of the sum ($SiO_2 + Al_2O_3$) to FeO is from 0.67 to 1.22 and of the sum (CaO + MgO) to FeO is from 0.22 to 0.75, equivalence of the behaviour of $SiO_2$ and $Al_2O_3$, as well as of MgO in the given process is taken into account. The chemical equivalence of the above-cited oxides is preserved, when the weight ratio of iron: aluminium oxide:magnesium oxide in the initial stock is not higher than 1:0.40:0.22; the presence of these oxides in the stock starts telling when the ratio of iron:aluminium oxide:magnesium oxide exceeds 1:0.003:0.03. Depending on the ratio of slag-forming components, the same coefficients of lead and zinc separation on a filter from carboniferous material are attainable at both high and low absolute values of the reduction rates of these oxides (the lead reduction rate/zinc reduction rate ratio does not change). The absolute values of the reduction rates of lead oxides (and zinc oxides) may differ by a factor of 2 to 2.5. With the weight ratio of the sum ($SiO_2 + Al_2O_3$) to FeO being 0.67 to 1.22, and of the sum (CaO + MgO) to FeO being 0.22 to 0.75, high characteristics of lead and zinc separation on the filter with the transformation of lead into metal and of zinc into rich slag are attained at the high absolute rates of the both processes: reduction of lead oxides and reduction of zinc oxides. Due to an essential difference in the affinity of lead oxide and zinc oxide to carbon, the rate of metal zinc formation on a coke filter is dozens of times higher than the rate of zinc sublimation, so that due to this difference, with the degree of lead reduction on the filter about 90%, the degree of zinc distilling-off does not exceed 4%. This part of zinc reduced to metal is oxidized again above the filter, intercepted together with the flame-melting dust, and recycled to the process together with the stock. Thus, due to the provision of the high reduction rates for the both target products—lead and zinc, a high efficiency of the entire reduction process is attained, both by enhancing the efficiency at the stage of producing lead metal in the course of filtering of the dispersed oxide melt through the filter of the carboniferous material and by a considerable enhancement in the efficiency of the subsequent stage of recovering zinc from the zinc-rich slag (electrothermal and fuming processes).

The fact that the bed of the carboniferous material is located directly below the flame enables an effective heat transfer from the zone of its intensive evolving to that of its consumption for the reactions of reduction of the lead oxides and makes it possible to attain a maximum possible reaction surface area for the material of a given particle size in the interaction of the oxide melt with carbon. Thus, for a floatation concentrate with a particle size of about 0.005 cm, the reaction area attainable for carbon thermic reduction is about $10^8$ cm$^2$ per ton of the concentrate as against $10^4$ cm$^2$ in the electrothermal process. Since the rate of reduction varies directly with the reaction surface area, the filtration of the melt through the bed of the carboniferous material results in the reduction of about 90% of lead to metal in less than 10 s.

It is expedient that the filtering bed be given a depth of 55 to 500 mm, which is maintained throughout the process.

This provides for extending the period of dripping of the oxide melt through the bed and for increasing the effective surface area of the reaction of reduction, this being of importance in case of an increase in the unit load of the melt on the filter, coarsening of the melt drops and, consequently, their more rapid transit through the filtering bed.

In a filtering bed whose average depth is less than 55 mm the carboniferous material lacks uniform distribution. It is essential that in the zone where the melt drops are falling in a particularly intensive manner the actual depth of the bed is less than the average one owing to the motion of the carboniferous particles in the convection-induced streams of the oxide melt below the filter, which cause the particles to form aggregates floating at the melt surface. An increase in the average bed depth over 55 mm leads to a uniform distribution of the carboniferous particles over the surface of the melt, which enhances the effective reducing capacity of the carboniferous material.

An increase in the bed depth over 500 mm results in an appreciable sublimation of zinc in the zone of the flame and in formation of a secondary zinc oxide which is immediately carried away with the dust-laden gas phase and therefore cannot dissolve in the oxide melt. This adds to the amount of the recycle oxide dust formed, reduces the temperature of the flame and lowers the degree of desulphurization. A combined effect of all these factors is a decrease in the actual throughput in terms of the sulphide stock.

The depth of the filtering bed may be maintained by feeding the solid reducing agent directly into the bed.

This permits a rapid replenishing of the consumed carboniferous material in significant amounts or rapid adjustment of the reducing capacity of the filter.

The depth of the filter of the carboniferous material may also be maintained by feeding this material together with the stock directed to the roasting-and-reduction.

This method of maintaining the bed depth is most suitable when the stock composition is rather stable. It ensures stoichiometric uniformity of feeding the reduction process reagents into the zone of their interaction (filter). A considerable difference between the ignition temperature of sulphides consisting of 0.05-mm floatative particles (350° to 450° C.) and that of the carboniferous material (700° to 900° C.) leads to a 80 to 90% oxidation of the sulphides within a distance of approximately ⅔ of the flame length. In other words, the bulk of oxidation proceeds in the upper part of the flame. At the same time, the particles of the carboniferous material in this upper zone of the flame are heated to 900°–1000° C. to a depth of 0.1 to 0.05 mm only, and their interaction with the oxygen of the gas phase does not go beyond 1 to 3%, since the content of oxygen in the gas phase lowers. Therefore, by the moment the particles of the carboniferous material reach the melt surface below the flame, they prove to be sufficiently heated from the surface, whereas practically all the reducing agent is concentrated in the filtering bed (layer), consumed for reducing the lead oxides as the latter drip in the form of the oxide melt through the filtering bed.

The requisite depth of the filter may be maintained by feeding the carboniferous material together with the stock and by charging it directly onto the filter.

This method of replenishing the consumed carboniferous material is most flexible, for it affords both coarse and fine adjustment of the bed depth.

All in all, the herein-proposed method of processing lead sulphide or lead-zinc sulphide ores, or their concentrates, or mixtures thereof offers the following advantages:

a 7 to 9.5-fold increase in the throughput of the process of direct lead extraction;

a 5 to 10% increase in the yield of the directly extracted lead;

a high rate of zinc sublimation from zinc-rich slag;

effective utilization of the calorific capacity of sulphides at the stage of reducing lead oxides to metal;

an improvement in the quality of zinc sublimates obtained from the zinc-containing slags by diminishing the content of lead oxides therein.

For a better understanding of the present invention, the following examples of its embodiment are given below by way of illustration.

EXAMPLE 1

A sulphide stock containing 46.85 wt.% of lead, 7.85 wt.% of zinc, 1.20 wt.% of copper, 6.75 wt.% of iron, 21.00 wt.% of sulphur, 6.85 wt.% of silicon dioxide, 0.60 wt.% of calcium oxide, 0.06 wt.% of magnesium oxide, and 2.15 wt.% of aluminium oxide is mixed with quartz sand taken in an amount providing for the content of pure $SiO_2$ of 1.7% by weight of the stock, and with lime taken in an amount providing for the content of pure CaO of 5.05% by weight of the stock. Added to the mixture of the stock with the fluxes is recycle dust formed in the course of the roasting-and-reduction process.

The moisture content in the charge thus prepared is 1%.

The reducing agent added to the charge is coke breeze in an amount of 2.0% by weight of the charge as calculated for carbon, and this mixture is directed to roasting-and-reduction in a vertical oxygen flame.

The resulting melt comes to a 40-mm deep coke filter for the lead oxides to be reduced to metal, and the molten slag from the flame zone is continuously to an electric heat-treatment furnace. In this furnace zinc is withdrawn from the slag and intercepted in the form of oxidized zinc sublimates. In this Example the weight ratio of the sum $(SiO_2+Al_2O_3)$ to FeO in the slag is 1.23, and the weight ratio of the sum $(CaO+MgO)$ to FeO is 0.66.

200 tons of the charge have been processed under these conditions. The experimental results are presented in Table 1.

EXAMPLE 2

The method is effected as in Example 1, except that the ratio of the sum $(SiO_2+Al_2O_3)$ in the slag to FeO in the charge is taken to be 1.09, and the ratio of the sum $(CaO+MgO)$ to FeO is taken to be 0.24. The experimental results are presented in Table 1.

TABLE 1

| Characteristics | Example 1 | Example 2 |
|---|---|---|
| 1. Throughput capacity of plant for concentrate, kg/h | 615 | 875 |
| 2. Throughput capacity of melting zone for lead, kg/h | 247.4 | 356.1 |
| 3. Extraction of lead into metal (direct extraction), % | 85.85 | 86.86 |
| 4. Consumption of oxygen per ton of concentrate, $Nm^3$ | 244 | 244 |
| 5. Degree of zinc transition into vapour-and-gas phase in melting zone on coke filter (recycle of zinc with melting-zone dust), % | 2.2 | 3.3 |
| 6. Throughput capacity of electric heat-treatment part of plant for zinc, kg/h | 37.3 | 58.4 |
| 7. Extraction of zinc into electric-furnace sublimates, % | 76.32 | 83.88 |
| 8. Extraction of lead into electric-furnace sublimates, % | 11.50 | 11.03 |
| 9. Extraction of lead from concentrate into metal | 97.35 | 97.89 |

TABLE 1-continued

| Characteristics | Example 1 | Example 2 |
|---|---|---|
| and into electric-furnace sublimates | | |

As can be seen from Table 1, when the characteristics of lead and zinc separation on the filter (conversion of lead into metal and transition of zinc into rich slag) are sufficiently close, in Example 2 higher characteristics are attained in terms of the throughput capacity, direct extraction of lead, specific capacity for zinc, and extraction of zinc into electric-furnace sublimates.

EXAMPLE 3

A sulphide stock containing 44.24 wt.% of lead, 7.19 wt.% of zinc, 1.56 wt.% of copper, 10.79 wt.% of iron, 14.96 wt.% of sulphur, 3.16 wt.% of silicon dioxide, 1.49 wt.% of calcium oxide, 2.64 wt.% of aluminium oxide, and 0.81 wt.% of magnesium oxide is mixed with quartz sand taken in an amount providing for the content of pure $SiO_2$ of 6.84% by weight of the sulphide stock, and with lime taken in an amount providing for the content of pure CaO of 9.23% by weight of the sulphide stock. The charge thus prepared is calcined in air in an electric furnace to a 93% desulphurization. The calcine is melted in an inert medium at 1300° C., coke breeze is placed stop the melt surface, and the melt is reduced to about 75%. The reduction rate of the lead and zinc oxides is determined from the chemical analysis of periodically taken melt samples, from the consumption of the reducing agent, from changes in the slag weight and from the composition of the gas phase. From the reduction rate value thus found (kg/h) and from the contacy area of the melt and the reducing agent ($m^2$), the specific rate of lead and zinc reduction is determined. From the reduction rate of the lead and zinc oxides the time required for the reduction of these components contained in 1000 kg of the concentrate for the reaction surface area of 1 $m^2$ is calculated. This factor characterizes the intensity of the extraction of both target components (lead and zinc) into commercial products.

In this experiment the weight ratio of the sum ($SiO_2+Al_2O_3$) in the slag to FeO is 0.91 and the weight ratio of the sum (CaO+MgO) to FeO is 0.83.

The experimental results are given in Table 2.

EXAMPLE 4

The method is effected as in Example 3, but differs in that the weight ratio of the sum ($SiO_2+Al_2O_3$) in the slag to FeO is taken to be 0.91 and the weight ratio of the sum (CaO+MgO) to FeO is taken to be 0.18.

The experimental results are given in Table 2.

EXAMPLE 5

The method is effected as in Example 3, but differs in that the weight ratio of the sum ($SiO_2+Al_2O_3$) to FeO in the slag is taken to be 0.67 and the weight ratio of the sum (CaO+MgO) to FeO is taken to be 0.33.

The experimental results are given in Table 2.

EXAMPLE 6

A sulphide stock containing 41.96% wt.% of lead, 4.03 wt.% of zinc, 1.64 wt.% of copper, 16.84 w.% of iron, 27.16 wt.% of sulphur, 1.45 wt.% of silicon dioxide, 0.36 wt.% of calcium oxide, 1.51 wt.% of aluminium oxide, and 0.27 wt.% of magnesium oxide is mixed with quartz sand taken in an amount providing for the content of pure $SiO_2$ of 17.19% by weight of the sulphide stock and with lime taken in an amount providing for the content of pure CaO of 14.32% by weight of sulphide stock.

The charge thus prepared is oxidized to a 91% desulphurization. The calcine is melted in an inert medium and the melt is reduced at 1300° C. with coke breeze to about 70% sublimation of zinc; after that the lead and zinc reduction rate is determined.

In this experiment the weight ratio in the slag of the sum ($SiO_2+Al_2O_3$) to Fe is 0.93 and the weight ratio of the sum (CaO+MgO) to FeO is 0.69.

The experimental results are given in Table 2.

EXAMPLE 7

The method is effected as in Example 6, but differs in that the weight ratio in the slag of the sum ($SiO_2+Al_2O_3$) to FeO is taken to be 1.22 and the weight ratio of the sum (CaO+MgO) to FeO is taken to be 0.75.

The experimental results are given in Table 2.

EXAMPLE 8

The method is effected as in Example 6, but differs in that the weight ratio in the slag of the sum ($SiO_2+Al_2O_3$) to FeO is taken to be 0.92 and the weight ratio of the sum (CaO+MgO) to FeO is taken to be 0.75.

The experimental results are given in Table 2.

EXAMPLE 9

The method is effected as in Example 6, but differs in that the weight ratio in the slag of the sum ($SiO_2+Al_2O_3$) to FeO is taken to be 1.37 and the weight ratio of the sum (CaO+MgO) to FeO is taken to be 0.83.

The experimental results are given in Table 2.

TABLE 2

Effect of the ratio of the main slag-forming components on the rate of reduction of lead and zinc oxides from oxide (slag) melt

| Nos | Example No. | Added per 100 g of concentrate | | Weight ratio in the charge | |
|---|---|---|---|---|---|
| | | Silicon dioxide | Calcium oxide | $\frac{SiO_2 + Al_2O}{FeO}$ | $\frac{CaO + MgO}{FeO}$ |
| 1 | 2 | 3 | 4 | 5 | 6 |
| 1 | 3 | 6.84 | 9.23 | 0.91 | 0.83 |
| 2 | 4 | 6.84 | 0.16 | 0.91 | 0.18 |
| 3 | 5 | 3.51 | 2.35 | 0.67 | 0.33 |
| 4 | 6 | 17.19 | 14.32 | 0.93 | 0.69 |
| 5 | 7 | 23.48 | 15.62 | 1.22 | 0.75 |
| 6 | 8 | 16.98 | 15.62 | 0.92 | 0.75 |
| 7 | 9 | 26.73 | 17.63 | 1.37 | 0.83 |
| 8 | 10 | 26.73 | 5.00 | 1.37 | 0.26 |
| 9 | 11 | 6.44 | 0.91 | 1.22 | 0.32 |
| 10 | 12 | 5.53 | 0.26 | 1.08 | 0.22 |
| 11 | 13 | 2.65 | 1.99 | 0.64 | 0.49 |
| 12 | 14 | 1.70 | 5.05 | 1.23 | 0.66 |

| Nos | Specific reduction rate, kg/$m^2$·h | | Reduction time of lead, zinc and total reduction time of lead and zinc, h | | |
|---|---|---|---|---|---|
| | Lead | Zinc | Lead | Zinc | Total time |
| | 7 | 8 | 9 | 10 | 11 |
| 1 | 720 | 12 | 0.61 + | 5.99 = | 6.60 |
| 2 | 550 | 10 | 0.80 + | 7.19 = | 7.99 |
| 3 | 1160 | 20 | 0.38 + | 3.59 = | 3.97 |
| 4 | 1480 | 27 | 0.28 + | 1.48 = | 1.76 |
| 5 | 1500 | 17.5 | 0.28 + | 2.30 = | 2.58 |
| 6 | 1080 | 24 | 0.39 + | 1.68 = | 2.07 |
| 7 | 700 | 9 | 0.60 + | 4.48 = | 5.08 |
| 8 | 350 | 4 | 1.20 + | 10.10 = | 11.30 |
| 9 | 1030 | 17 | 0.63 + | 2.12 = | 2.75 |
| 10 | 1050 | 16 | 0.62 + | 2.25 = | 2.87 |
| 11 | 710 | 7 | 0.92 + | 5.14 = | 6.06 |

TABLE 2-continued

Effect of the ratio of the main slag-forming components on the rate of reduction of lead and zinc oxides from oxide (slag) melt

| 12 | 1000 | 10 | 0.47 | + | 7.95 | = | 8.42 |

EXAMPLE 10

The method is effected as in Example 6, but differs in that the weight ratio in the slag of the sum ($SiO_2 + Al_2O_3$) to FeO is taken to be 1.37 and the weight ratio of the sum ($CaO + MgO$) to FeO is taken to be 0.26.

The experimental results are given in Table 2.

EXAMPLE 11

A sulphide stock containing 65.48 wt.% of lead, 3.60 wt.% of zinc, 1.49 wt.% of copper, 5.05 wt.% of iron, 17.95 wt.% of sulphur, 0.60 wt.% of silicon dioxide, 0.22 wt.% of calcium oxide, 0.88 wt.% of aluminium oxide, and 0.95 wt.% of magnesium oxide is mixed with quartz sand taken in an amount providing for the content of pure $SiO_2$ of 6.44% by weight of the sulphide stock and with lime taken in an amount providing for the content of pure CaO of 0.19% by weight of the sulphide stock.

The charge is subjected to oxidation to a 88% desulphurization. The calcine is melted in an inert medium, and the melt is reduced at 1300° C. with coke breeze to the sublimation of zinc of about 65%; after that the rate of lead with zinc reduction is determined.

In this experiment the weight ratio in the slag of the sum ($SiO_2 + Al_2O_3$) to FeO is 1.22 and the weight ratio of the sum ($CaO + MgO$) to Fe is 0.32.

The experimental results are given in Table 2.

EXAMPLE 12

The method is effected as in Example 11, but differs in that the weight ratio in the slag of the sum ($SiO_2 + Al_2O_3$) to Fe is taken to be 1.08 and the weight ratio of the sum ($CaO + MgO$) to FeO is taken to be 0.22.

The experimental results are given in Table 2.

EXAMPLE 13

The method is effected as in Example 11, but differs in that the weight ratio in the slag of the sum ($SiO_2 + Al_2O_3$) to FeO is taken to be 0.64 and the weight ratio of the sum ($CaO + MgO$) to FeO is taken to be 0.49.

The experimental results are given in Table 2.

EXAMPLE 14

A sulphide stock containing 46.85 wt.% of lead, 7.95 wt.% of zinc, 1.20 wt.% of copper, 6.75 wt.% of iron, 21.00 wt.% of sulphur, 6.85 wt.% of silicon dioxide, 0.60 wt.% of calcium oxide, 0.06 wt.% of magnesium oxide, and 2.15 wt.% of aluminium oxide is mixed with quartz sand taken in an amount providing for the content of pure $SiO_2$ of 1.70% by weight of the sulphide stock and with lime taken in an amount providing for the content of pure CaO of 5.05% by weight of the sulphide stock.

The charge thus prepared is oxidized to a 94% desulphurization. The calcine is melted in an inert medium and the melt is reduced at 1300° C. with coke breeze to the sublimation of zinc of about 75%, after which the rate of lead and zinc reduction is determined.

In this experiment the weight ratio in the slag of the sum ($SiO_2 + Al_2O_3$) to FeO is 1.23 and the weight ratio of the sum ($CaO + MgO$) to FeO is 0.66.

The experimental results are given in Table 2.

EXAMPLE 15

A sulphide stock containing 51.83 wt.% of Pb, 7.54 wt.% of Zn, 0.60 wt.% of Cu, 6.31 wt.% of Fe, 17.76 wt.% of S, 16 wt.% of $Al_2O_3$, and 0.03 wt.% of Mg is mixed with quartz sand taken in an amount providing for the content or pure $SiO_2$ of 7.06% by weight of the sulphide stock and with slaked lime taken in an amount providing for the content of CaO of 5.02% by weight of the sulphide stock. To the mixture of the sulphide stock and the fluxes recycle dust of the roasting-and-reduction process is added. The humidity of the charge thus prepared is 1 wt.%.

As a reducing agent coal is added to the charge in the amount of 2.6% by weight of the charge (2.0 wt.% as calculated for carbon), and the resulting mixture is directed to roasting-and-reduction through an oxygen flame.

The roasting-and-reduction of the charge is conducted in industrial oxygen at the flow rate thereof of 214 $Nm^3$ per ton of the charge.

The resulting oxide melt passes through the coal filter, and the zinc-rich slag is supplied to an electric furnace operating as a settler.

The experimental results are presented in Table 3.

EXAMPLE 16

The method is effected as in Example 15, but differs in that a 40-mm deep coal bed is created on the melt surface. The 40-mm coal layer is maintained by feeding the reducing agent together with the charge.

The total consumption of the reducing agent is 20 kg of carbon per ton of the charge.

The experimental results are presented in Table 3.

TABLE 3

Effect of the depth of the filtering bed of carboniferous material on the process of lead extraction in the zone flame

| | | | | | | | Present method | | | | | | |
| | | Reducing agent fed with stock | | 40-mm deep bed of reducing agent | | 55-mm deep bed of reducing agent | | Depth of reducing layer | | | | Depth of reducing agent bed | |
| | | | | | | | | 350 | | 500 mm | | | |
| Nos | Characteristics | Q-ty, t | % of total | Q-ty, t | % of total | Q-ty, t | % of total | Q-ty, t | % of total | Q-ty, t | % of total | Q-ty, t | % of total |
| 1 | 2 | 3 | 4 | 5 | 6 | 7 | 8 | 9 | 10 | 11 | 12 | 13 | 14 |
| 1 | Throughput, t/h | 1.55 | | 1.56 | | 2.1 | | 4.5 | | 3.9 | | 1.5 | |
| | Charged: | | | | | | | | | | | | |
| 2 | lead | 96.2 | 100 | 96.2 | 100 | 96.2 | 100 | 96.2 | 100 | 96.2 | 100 | 96.2 | 100 |
| 3 | zinc | 14.0 | 100 | 14.0 | 100 | 14.0 | 100 | 14.0 | 100 | 14.0 | 100 | 14.0 | 100 |
| | Produced: | | | | | | | | | | | | |
| 4 | black lead | 90.6 | | 89.2 | | 90.8 | | 91.0 | | 90.2 | | 88.5 | |

TABLE 3-continued

Effect of the depth of the filtering bed of carboniferous material on the process of lead extraction in the zone flame

| | | Reducing agent fed with stock | | 40-mm deep bed of reducing agent | | Present method | | | | | | Depth of reducing agent bed | |
|---|---|---|---|---|---|---|---|---|---|---|---|---|---|
| | | | | | | 55-mm deep bed of reducing agent | | Depth of reducing layer | | | | | |
| | | | | | | | | 350 | | 500 mm | | | |
| Nos 1 | Characteristics 2 | Q-ty, t 3 | % of total 4 | Q-ty, t 5 | % of total 6 | Q-ty, t 7 | % of total 8 | Q-ty, t 9 | % of total 10 | Q-ty,t 11 | % of total 12 | Q-ty, t 13 | % of total 14 |
| | including | | | | | | | | | | | | |
| 5 | lead | 87.93 | 91.4 | 86.48 | 89.9 | 88.08 | 91.56 | 88.31 | 91.8 | 87.54 | 91.0 | 85.81 | 89.2 |
| 6 | slag | 50.2 | | 50.8 | | 50.5 | | 51.0 | | 50.7 | | 52.1 | |
| | including | | | | | | | | | | | | |
| 7 | lead | 1.0 | 1.04 | 0.99 | 1.03 | 0.97 | 1.01 | 1.05 | 1.09 | 1.02 | 1.06 | 2.61 | 2.71 |
| 8 | electric-furnace sublimates | 16.6 | | 16.4 | | 16.45 | | 16.3 | | 16.5 | | 17.1 | |
| | including | | | | | | | | | | | | |
| 9 | lead | 5.81 | 6.04 | 5.82 | 6.05 | 5.77 | 6.00 | 5.74 | 5.96 | 5.94 | 6.17 | 6.33 | 6.58 |
| 10. | zinc | 7.47 | 53.4 | 7.40 | 52.9 | 7.33 | 52.4 | 7.35 | 52.5 | 7.41 | 52.9 | 7.7 | 55.0 |

EXAMPLE 17

The starting charge is prepared as described in Example 15.

Charged onto the surface of the oxide melt into the zone of flame is coke breeze to make a 55-mm deep bed. The charge is melted in an atmosphere of industrial oxygen, whose consumption is 214 Nm$^3$ per ton of the charge. The depth of the coke bed in the course of melting is maintained at 55 mm by continuously charging the coke breeze directly into the bed in an amount of 20 kg (as calculated for carbon) per ton of the charge.

The melt formed in the roasting-and-reduction process passes through this bed, while the zinc-rich slag is directed to an electric furnace operating as a settler.

The total consumption of the reducing agent amounts to 20 kg of carbon per ton of the charge.

The experimental results are presented in Table 3.

EXAMPLE 18

The method is effected as in Example 17, but differs in that the depth of the bed of the carboniferous material is made and maintained to be 350 mm.

The experimental results are presented in Table 3.

EXAMPLE 19

The starting charge is prepared as specified in Example 15. The reducing agent is coal added to the charge in an amount of 15 kg of carbon per ton of the charge.

On the surface of the melt a 500-mm deep bed of coal is created.

The charge is melted in an atmosphere of industrial oxygen, whose consumption is 214 Nm$^3$ per ton of the charge. The depth of the coal bed is maintained at 500 mm by continuously feeding coal into the bed in such an amount as to provide for the quantity of 5 kg of carbon per ton of the charge. By feeding coal with the charge directly into the filter, the depth of the latter in the course of roasting-and-reduction is maintained at 500 mm.

The total consumption of coal amounts to 20 kg of carbon per ton of the charge.

The experimental results are presented in Table 3.

EXAMPLE 20

The method is effected as in Example 17, but differs in that the depth of the bed of the carbonaceous material is made and maintained to be 550 mm.

The experimental results are presented in Table 3.

EXAMPLE 21

A sulphide stock containing 44.85 wt.% of Pb, 19.27 wt.% of Zn, 0.83 wt.% of Cu, 17.97 wt.% of S, and 11.62 wt.% of Fe is mixed with quartz sand taken in an amount providing for the content of pure SiO$_2$ of 10.2% by weight of the sulphide stock and with slaked lime taken in an amount providing for the content of pure CaO of 7.22% by weight of the sulphide stock. Added to the resulting mixture of the sulphide stock and the fluxes is recycle dust of the roasting-and-reduction process. The humidity of the charge thus prepared is 0.5 wt.%. Added to the charge as a reducing agent is coal in an amount of 2.95% by weight of the charge (2.2% as calculated for carbon), and this mixture is subjected to roasting-and-reduction in an oxygen flame. The consumption of oxygen is 200 Nm$^3$ per ton of the charge.

The oxide melt obtained in the roasting-and-reduction process is fed to the 100-mm deep coal filter to reduce the lead oxides to metal, while the slag melt from the flame zone continuously flows over to an electric heat-treatment furnace operating as a settler.

To compensate for the thermal losses in the bed of the carboniferous material (filter), caused by the endothermic reactions of reducing the oxide melt, oxygen-enriched air is supplied to the filter in an amount of 10 to 12 Nm$^3$ of oxygen per ton of the charge. As a result, the temperature of the filter is maintained at 1100° to 1400° C.

The total consumption of coal is 28 kg of carbon per ton of the charge.

300 tons of the charge have been melted on the plant operating with oxygen being fed into the filter.

The experimental results (as calculated per ton of the charge) are given hereinbelow.

| | Quantity | |
|---|---|---|
| | kg | % of total |
| Loaded with charge: | | |
| lead | 382 | 100 |

-continued

|  | Quantity | |
|---|---|---|
|  | kg | % of total |
| zinc | 164 | 100 |
| Produced: | | |
| black lead | 332.7 | |
| including lead | 322.4 | 84.4 |
| slag | 425 | |
| including lead | 8.71 | 2.28 |
| zinc | 82.5 | 50.3 |
| electric-furnace | | |
| sublimates | 159.5 | |
| including lead | 50.9 | 13.3 |
| zinc | 76.59 | 46.7 |

As can be seen from the above data, direct extraction of lead comes to 84.4% (without taking into account processing of the slag and sublimates); 50.3% of zinc remained in the slag having the following composition: 24% of zinc oxide, 30% ferrous oxide, 24% of silicon dioxide, and 17% of calcium oxide. The electric-furnace sublimates contain 31.9% of lead and 48.0% of zinc.

EXAMPLE 22

The method is effected as in Example 21, but differs in that no oxygen-enriched air is fed to the filter.

This Example failed to give positive results due to an increase in the viscosity of the oxide melt in its passage through the filter, caused by lowering of the temperature in the filter below 1100° C.

What is claimed is:

1. A method for the recovery of lead from a mixture comprising lead and iron sulphides optionally further containing one or both of zinc and copper sulphides which comprises (1) admixing said sulphides with fluxes, (2) oxidizing the sulphide in the presence of said fluxes to produce oxides of the metals present including ferrous oxide and lead oxide and (3) passing the oxidized product so obtained in the form of metal oxide droplets into a bed of solid carboniferrous material to effect selective reduction of lead oxide to lead leaving a slag containing other metals present in oxide form wherein
   (a) said fluxes are lime- and silicon dioxide-containing fluxes said fluxes may optionally contain aluminum oxide and magnesium oxide and are employed in amounts to result in the following ratios being present in the oxidized product: sum of silicon dioxide and any aluminum dioxide present:ferrous oxide of 0.67 to 1.22:1, sum of calcium oxide and any magnesium oxide present:ferrous oxide of 0.22 to 0.75:1
   (b) dust is obtained in the oxidation and is recycled to be mixed with the fluxes and the sulphides
   (c) the oxidation is effected by feeding said mixture of sulphides, fluxes and recycled dust in suspended state in an oxygen into a vertical flame to effect 85-100 percent desulfurization thereby producing droplets of oxides of the metals and
   (d) the carboniferrous material into which said droplets are passed is selected from the group consisting of coke and coal.

2. A method according to claim 1 which comprises passing metal oxide droplets into said carboniferrous material a temperature of 1100° to 1400° C.

3. A method according to claim 1, wherein said mixture of sulphides comprises zinc sulphide.

4. A method according to claim 3 which comprises removing molten lead obtained by passage of the metal oxide droplets into the carbonaceous layer and passing the slag remaining after reduction of lead oxide to lead to an electric reduction furnace to sublime off zinc.

5. A method according to claim 1, wherein said solid carboniferrous material is a bed on to which the metal oxide droplets fall.

6. A method according to claim 5 wherein said bed in maintained at a depth of 55 to 500 mm.

7. A method according to claim 6, wherein said bed is maintained floating on the surface of a slag of oxide of metals more electropositive than lead.

* * * * *